United States Patent [19]

McMann

[11] 3,755,620

[45] Aug. 28, 1973

[54] SINGLE TUBE COLOR TELEVISION CAMERA SYSTEM AND METHOD

[75] Inventor: Renville H. McMann, New Canaan, Conn.

[73] Assignee: Columbia Broadcasting System, Inc., New York, N.Y.

[22] Filed: June 30, 1972

[21] Appl. No.: 267,988

[52] U.S. Cl. .............................................. 178/5.4 ST
[51] Int. Cl. .............................................. H04n 9/06
[58] Field of Search ...................... 178/5.4 R, 5.4 ST

[56] References Cited

UNITED STATES PATENTS

| | | | |
|---|---|---|---|
| 2,710,309 | 6/1955 | Antranikian | 178/5.4 ST |
| 3,479,450 | 11/1969 | McMann, Jr. | 178/5.4 ST |
| 3,483,315 | 12/1969 | McMann, Jr. | 178/5.4 ST |

*Primary Examiner*—Robert L. Richardson
*Attorney*—Martin M. Novack

[57] ABSTRACT

A color television camera system for producing coherent chroma video signals representative of the color content of a scene. A filter is disposed in the optical path of the scene, the filter having a striped array of colored areas thereon. A single camera tube electronically scans the image projected through the filter and generates color signals representative of the filtered image. The color signals are translated to a lower frequency. Means are provided for projecting, during selected field scans, a uniformly colored field on said filter. The translated color signals generated during the selected field scans are stored in a digital storage circuit. Subsequently, the translated color signals generated during non-selected fields are modified in accordance with the stored signals to produce coherent chroma signals.

20 Claims, 4 Drawing Figures

PATENTED AUG 28 1973 3,755,620

SINGLE TUBE COLOR TELEVISION CAMERA SYSTEM AND METHOD

BACKGROUND OF THE INVENTION

The type of color television camera that is currently in most widespread use employs three image pickup tubes to derive separate primary color signals. These cameras have limited acceptability because they are expensive and difficult to maintain. For this reason, there have been a number of recent attempts at developing color cameras which require less than three tubes to produce the desired color signals. Many of these schemes involve the use of patterned filters in the optical path of the camera.

In one of the single tube techniques, the sole camera tube receives the color scene through an optical filter composed of recurring vertical striped sections. Each striped section includes a red, a blue, and a green filter stripe, so that signals corresponding to the three primary colors can be generated by the one camera tube. In this system, limitations of the scan linearity of the tube's scanning beam necessitate that indexing signals be provided so that a reference exists for sampling the proper color at the proper time during the beam scan. Therefore, each striped section includes a black indexing stripe that is used to generate an indexing signal. This technique has the disadvantage of consuming essential filter space and introducing a large number of recurring discontinuities in the scanning of the color scene.

Another class of single tube prior art systems operates on the basis of an assignment of a specific frequency to each color signal. In these systems, different orientation angles are provided for the different stripe colors and the generated chrominance signal components are distinguished from each other by frequency. Separation is achieved using electronic filters. These types of systems are desirably insensitive to scan nonlinearity since the resulting frequency changes are not large enough to significantly alter the selectivity characteristics of the separation filters. However, a problem with these systems stems from the crowding of the frequency spectrum, since substantial bandwidth need be provided for each of the different color signals.

In my U.S. Pat. No. 3,479,450, there is disclosed another type of color camera system which requires only a single camera tube for derivation of color information signals. Briefly, an embodiment of that system operates in the following manner: An object field being viewed is separated into its respective primary color components with a color stripe filter interposed between the object field and the camera target. The filter consists of a sequence of successive red, green and blue filter stripes arranged in a parallel manner at right angles to the lines of the camera scanning raster. The signal output from the camera represents a sequential series of segments of the respective primary color components present in the object field. During selected scanning fields, a particular colored object field (red) is interposed in the camera's field of view so that the video signal that is generated during that field relates to the relative portion of the red stripes of the filter as a function of the scanning beam position. The video signal generated during the selected scan is stored on a recording means, such as a rotating disc.

During subsequent field scans, the recorded information is utilized as an "index" to separate out the red, green and blue portions of the video signal generated by the camera tube. Specifically, this is done by using the recorded signal to enable a "red" gate to pass the video signal from the camera only during the presence of the recorded indexing signal. In this manner, a red color signal is derived, it being assumed that the scanning beam will be traversing red stripes at stubstantially the same relative time periods during a number of successive field scans.

The blue and green color signals are derived in a similar manner but, in these cases, delay lines are used to delay the occurrence of the recorded indexing signals by amounts that correspond to the time it takes for the scanning beam to traverse individual stripes during a line scan. To illustrate, if a red indexing signal begins at a particular time, then, depending upon the width of the red stripe and the scanning speed, the beam will begin to traverse the neighboring blue stripe a short predetermined time after the given time, for example, a fraction of a microsecond later. Therefore, a "blue" gate, which also receives the video signal from the camera, is enabled by the stored indexing signal as delayed by the predetermined time. The output of the blue gate is the blue color signal. It takes about twice the predetermined time for the beam to reach the green stripe, so an accordingly longer delay time is introduced before the indexing beam is received at a "green" gate which generates the green color signal.

In the particular embodiment of the referenced patent, a second camera tube is utilized to obtain a luminance signal which is coupled to standard matrixing circuitry along with the derived red, green, and blue color signals. The outputs of the matrixing circuitry are signals commonly designated I, Y and Q, and these can be subsequently encoded to produce composite color video in NTSC form.

The elimination of the need for special indexing stripes in the filter setup is advantageous, but various aspects of the described technique for accomplishing indexing have need of improvement. One drawback relates to the utilization of a disc storage medium. The time base stability needed for derivation of the color signals using stored index signals is of the order of fractions of microseconds, and the maintenance of the required accuracy over a field scan using a disc or other moving magnetic storage is difficult. The described technique utilizes a number of filter stripes that are sufficiently narrow to resolve colors with required accuracy, but may not be sufficiently narrow to yield a luminance signal that meets required standards. Accordingly, the particular described embodiment utilizes a second camera tube to derive a luminance signal. If the number of filter stripes had been increased so that an acceptable luminance bandwidth was obtainable, the time base stability requirements of the storage drum would have had to be even more stringent. Thus, it was practical to utilize a second tube to achieve luminance, the substantial performance improvement being traded-off against the increased cost and alignment problems associated with a second tube.

The disclosed technique utilizes matrixing circuitry to derive I and Q which can be encoded in phase quadrature and combined with Y to produce composite color video in accordance with NTSC standards. This is also the method of conventional three-tube color cameras. It would be of appreciable advantage to devise a color camera setup that could produce composite color video without the need for matrixing or quadrature encoding.

It is among the objects of the present invention to deal with the disadvantages of the prior art and to generally make improvements responsive to the discussed needs.

SUMMARY OF THE INVENTION

The present invention is directed to a single tube color television camera system for producing coherent chroma video signals representative of the color content of a scene. A filter is disposed in the optical path of the scene, the filter having an array of colored areas thereon. Means are provided for electronically raster scanning the image projected through the filter and for generating color signals representative of the filtered image. The generated color signals are then translated to a lower frequency by a mixer. Means are provided for projecting, during selected field scans, a uniformly colored field on the filter. Further means store the translated color signals generated during the selected field scans. Finally, means are provided for modifying translated color signals generated during non-selected fields in accordance with the stored signals to produce coherent chroma signals.

In a preferred embodiment of the invention, means are provided for digitizing the translated color signals generated during the selected field scans before the storage thereof.

Further features and advantages of the invention will become more readily apparent from the following detailed description when taken in conjunction with the accompanying drawings.

DESCRIPTION OF THE PREFERRED EMBODIMENT

Figure 1:
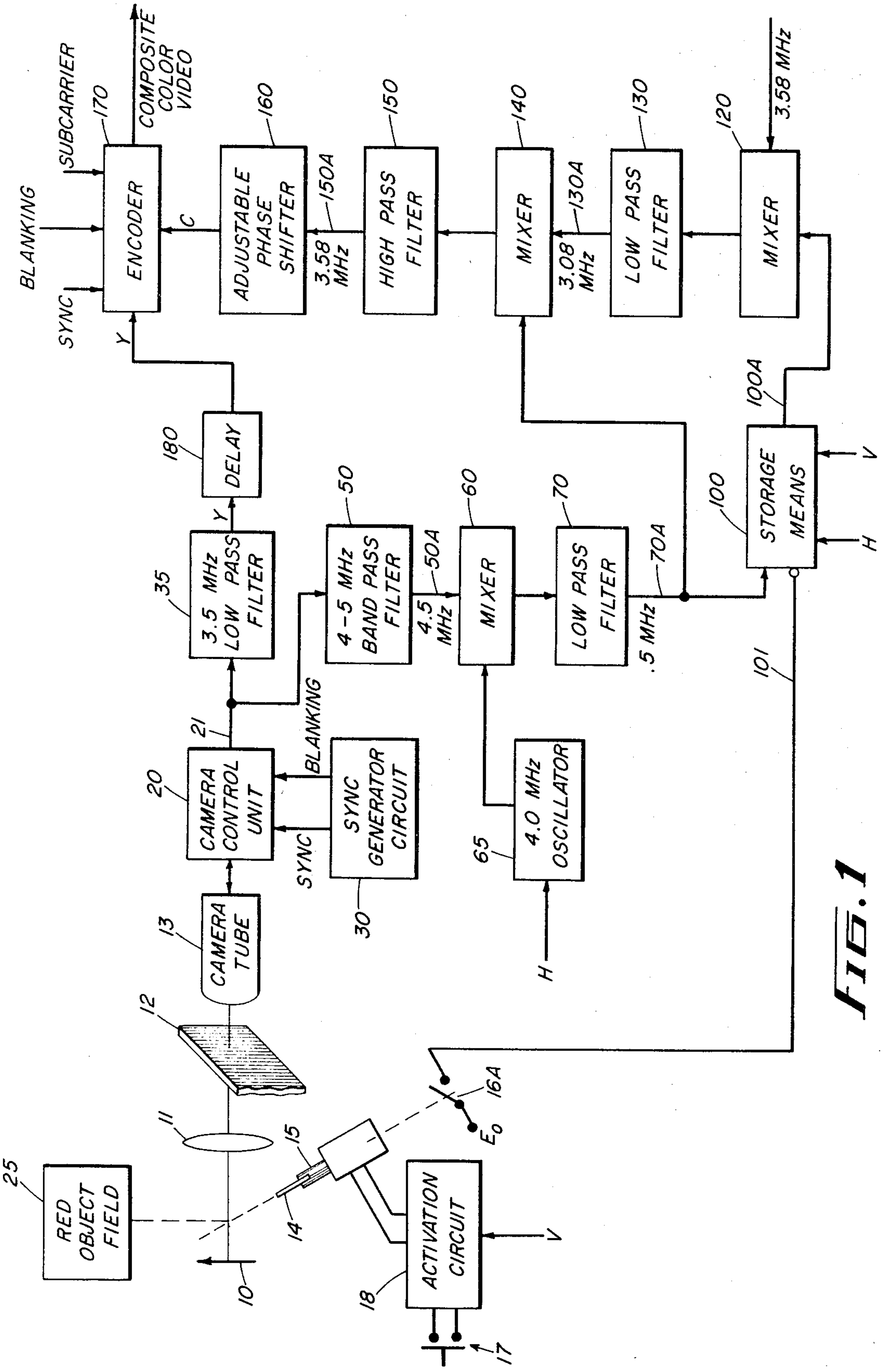
FIG. 1 is a block diagram of a color television camera system in accordance with the invention.

Referring to FIG. 1, there is shown a color television camera system in accordance with the present invention. Light from an object field 10 is collected by an optical system represented pictorially by the lens 11. The collected light passes through a filter 12 that has an array of colored areas thereon. Preferably, the filter has a striped pattern that includes a number of groups of narrow primary-colored stripes, each group consisting of successive red, blue and green vertical stripes. The filtered light from the object field is received by an electronic scanning device or tube 13 that may typically comprise a vidicon or plumbicon of the type associated with a standard black and white television camera. The filter may be disposed on a fiber optics faceplate that is adjacent the photosensitive surface of the tube. The tube 13 is controlled by a conventional camera control unit 20 which receives vertical and horizontal synchronizing signals and blanking signals from a conventional sync generator circuit 30.

Further included in the optical arrangement is a mirror 14 which is attached to the plunger 15 of a solenoid 16. The solenoid includes an associated contact 16A, shown in its normally opened position, which is urged to a closed position whenever the solenoid 16 is activated. Activation of the solenoid 16 also causes its plunger 15 to extrude and interpose the mirror in the path of the object field 10. A uniformly colored object field 25 is provided at a position that will reflect towards the scanning device when the mirror 14 is so interposed. The object field 25 may be of any preselected color, a red object field being utilized in the present embodiment.

The input terminals of the solenoid 16 are coupled to an activation circuit 18 which receives the vertical synchronization signal from the sync generator 30 and activates the solenoid 16 for a single vertical scan period that is designated as a "selected" vertical scan period. A pushbutton switch 17 is provided to determine the selected vertical scan as being the next full vertical scan that occurs after the switch 17 is closed. As will be described, the pushbutton will be depressed at relatively infrequent intervals for normal operation so that the selected field scans, during which the red field is viewed, occur at correspondingly infrequent intervals, of the order of minutes apart.

As stated, the camera tube 13 is of the conventional black and white variety, so it has no ability to determine the color of the impinging light, but detects only the intensity at successive points on the target area. The camera tube output, represented as the signal on a line 21, includes a relatively low frequency monochrome component and a relatively high frequency component that contains chrominance information. The high frequency chrominance signal is present by virtue of the narrow stripe pattern which serves to effectively divide the object scene into color stripe components as a function of position.

Figure 2:
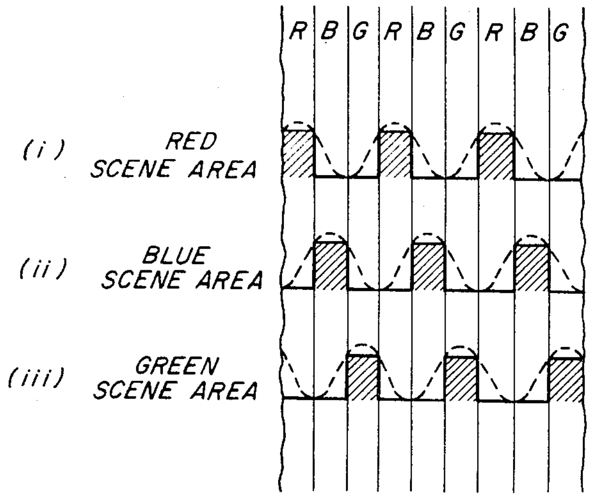
FIG. 2 is a simplified graph of electrical signals developed when scanning areas of different colors through a color stripe filter.

The basic frequency of the chrominance information is determined by the number of stripes traversed by the scanning beam per unit time. In the present embodiment there are 225 groups or "triplets" of red, blue and green stripes so that, for an active horizontal scan time of about 50 microseconds, the resultant chrominance carrier signal is 4.5 Megahertz; i.e., $225 \div (50 \times 10^{-6})$. The chrominance information is contained in the relative phase of the 4.5 MHz. chrominance signal. This is illustrated for a situation of approximately equal stripe widths in the simplified graph of FIG. 2 which depicts the electrical signals that are developed by scanning scene areas of different colors. In graph (*i*), the signal developed when scanning a red scene area is shown as an idealized rectangular wave having positive portions (shaded in the FIGURE) that correspond in time with the scanning of the red stripes. The broken line curve represents the fundamental frequency component of the rectangular wave which is at 4.5 MHz. in the present embodiment. The signals developed when scanning the same area with a blue or green scene portion present are shown in graphs (*ii*) and (*iii*), respectively. These signals also have a 4.5 MHz. fundamental, but have different relative phases due to the relative spatial positions of the color stripes.

Referring again to FIG. 1, the camera tube output on line 21 is coupled to a low-pass filter 35 which has a filter characteristic that passes frequencies between about 0 MHz. and 3.5 MHz. This filter rejects the chrominance component of a camera output which was seen above to be centered at 4.5 MHz., and passes the lower frequency which represents the luminance content of the scene being observed. The stripes in the pattern of the present embodiment are sufficiently narrow to yield an acceptable bandwidth luminance signal and still have sufficient bandwidth remaining to contain the color information.

The signal on line 21 is also coupled to a bandpass filter 50 that has a characteristic which passes frequencies between about 4 and 5 MHz. The filter 50 limits the bandwidth of the color information to 1 MHz., this bandwidth being sufficient to meet the capabilities of practical receiver systems. The output of the filter 50 is therefore a 4.5 MHz. color signal 50A having a bandwidth of 1 MHz. The signal 50A is coupled to a doubly balanced heterodyning mixer 60 which receives as its other input the output of a 4 MHz. phase-locked oscillator 65. The oscillator 65 receives the horizontal sync signal from the sync generator 30 and phase locks the generated 4 MHz. signal to the horizontal sync, so that the phase reference of the oscillator signal is reestablished for each horizontal scanline. The mixer 60 heterodynes its two inputs and generates lower and upper frequency bands centered at 0.5 MHz. and 8.5 MHz. respectively. The output of mixer 60 is filtered by a 1 MHz. low-pass filter 70 to produce an output 70A which consists of a 1 MHz. bandwidth signal centered at .5 MHz. In other words, the signal 70A is a version of the 4.5 MHz. color signal **50*a* translated down to 0.5 MHz. The reason for performing this frequency translation will become later apparent, it sufficing for the present to recognize that the signal 70A** contains the basic color-representative phase information of the original 4.5 MHz. color signal, but at a lower frequency.

The output 70A is coupled to a storage means 100, preferably of a digital type, a detailed description of which is set forth hereinbelow. The storage means 100 stores the color signals 70A that occur during the selected scanning fields, and then non-destructively reads out the stored signals a number of times before a new field of information is stored therein. The storage means 100 is enabled to receive the signals 70A by an enabling signal on a line 101 which is coupled, via contact **16*a* in solenoid 16, to a voltage source $E_o$. It follows from the prior description of the solenoid operation that the storage means is enabled to store the signal 70A only during the selected field that occurs when the pushbutton switch 17 has been depressed. Storage means 100 is synchronized by the horizontal and vertical sync signals from the sync generator 30 in a manner to be presented. During non-selected fields, the previously stored signals 70A are read out in their entirety as a signal designated 100A, the signal 100A** being repeated every field scan.

The signal 100A is coupled as one input to a doubly balanced heterodyning mixer 120, the other input to which is a standard 3.58 MHz. color carrier signal from sync generator 30. The signal 100A is a stored version of a prior signal 70A which, it will be recalled, was a 1 MHz. bandwidth signal centered at 0.5 MHz. Therefore, the output of mixer 120 includes a lower sideband having a bandwidth of 1 MHz. and centered at 3.08 MHz. This lower sideband is selected by low-pass filter 130 which produces an output signal designated 130A.

Reviewing briefly the description to this point, the signal 70A is a color signal representative of the instantaneous color content of the target area being scanned. The signal 130A is a stored color signal from a previous selected scan, this stored signal representing the color content of a red field sensed at a corresponding target area. By virtue of the synchronization of the storage means 100 by the vertical and horizontal sync signals, the signals 70A and 130A are effectively synchronized.

The signals 70A and 130A are mixed in another doubly balanced heterodyning mixer 140 and the higher frequency output, i.e. the output at 3.58 MHz., is selected by a high pass filter 150 as the desired coherent chrominance signal, 150A.

In the present invention, the signal 130A is utilized as an indexing signal which contains information that relates to the scanning characteristics of the beam in the camera tube 13. It is assumed that the scanning beam traverses particular stripes (the red ones in the present embodiment) at substantially the same relative time periods during successive field scans. The relative stripe timing information for the selected scan is contained in the relative phase of the stored red field color signal. This signal is then used as an index during subsequent field scans.

To better understand the indexing technique, it is helpful to visualize the relative phase of the raw 4.5 MHz. color signal derived from the camera. If the stripe pattern geometry was perfectly uniform and the beam scanning rate was exactly uniform during each horizontal scanline, the instantaneous phase of the color signal would depend only on the relative positions of the stripes. For example, in FIG. 2, if red were arbitrarily chosen as having a phase angle of 0°, then blue and green would have relative phase angles of 120° and 240°, respectively. For a uniformly scanning beam, these phase angles, designated $\phi_c$ for a particular color being scanned, would hold true as a function of time over each horizontal scanline. In a practical scanner, however, the instantaneous relative phase also depends upon the accumulated "phase error" designated $\phi_e$, that results from variations in stripe geometry or beam scanning rate during a particular scanline.

In the embodiment of FIG. 1, the signal 50A can thus be thought of as having a relative phase of $\phi_c + \phi_e$. The lower sideband signal 70A would then have a relative phase of $-(\phi_c + \phi_e)$. For the stored signal 100A, the appropriate relative phase is $-(\phi_c' + \phi_e')$ where the primes designate the stored signal. The signal 130A, being a lower sideband, has a phase of $\phi_c' + \phi_e'$ (from the double negative). Finally, the upper sideband signal 150A that results from mixing signals 70A and 130A, has a relative phase of $-(\phi_c + \phi_e) + (\phi_c' + \phi_e')$. The phase $\phi_c'$ is a constant since it relates to the single color of the stored uniform red field. Also, the assumption that the scanning beam acts substantially identically for a number of successive field scans means that $\phi_3 = \phi_e'$. With these factors in mind, the expression for the relative phase of signal 150A reduces to $K - \phi_c$ where K is a constant. The relative phase of signal 150A is therefore proportional to a predetermined phase associated with the target color being instantaneously scanned.

The stripe widths and the color sequence of the triplets of filter 12 are selected to produce color signal phase angles $\phi_c$ that vary with the target color in compatibility with the electrical angles of the NTSC color circle. A suitable left-to-right order is red, blue and green, with the stripes having normalized relative widths of 0.40, 0.24, and 0.36, respectively. These widths can be calculated from an NTSC color-phase vector diagram and a disclosure of the principles for obtaining the proper color phases can be found in U.S. Pat. No. 3,535,992. In the present embodiment, red, blue and green stripes and particular phase relationships are set forth, but it should be pointed out that alternative colors or phase relationships can be employed if desired. For example, the primary complements cyan, yellow, and magneta are suitable.

The output 150A is coupled through an adjustable phase shifter 160 to an encoder 170. When adjusted, the phase shifter 160 introduces an appropriate fixed phase shift to the signal 150A such that its angular reference corresponds approximately to the NTSC color vector angles; i.e., 103° = red, 168° = yellow, etc. The output of the phase shifter, C, is therefore a true NTSC chrominance signal. The encoder 170 also receives the filtered luminance signal Y via a delay 180. The delay is necessary to re-align the timing of Y and C in view of the transition time of the chrominance component through the processing circuitry.

The encoder 170 combines Y and C in known manner and adds sync and blanking, references for which are derived from the generator circuit 30. A subcarrier reference signal at 3.58 MHz. is also received from the sync generator and is utilized in adding a burst. No forming of difference signals or guadrature matrixing is required since C is already in a form suitable for adding to Y. The output of encoder 170 is a composite NTSC color video signal.

In operation of the camera system, it is necessary to "refresh" the stored indexing signal every few minutes, and this can be accomplished by the camera operator by depressing pushbutton 17. The recommended refresh duration will depend on the inherent scan stability of the tube and upon operating conditions such as the amount of necessary camera motion. When a selected field is actuated, a red field (or a blanked field can be provided for) appears in the video. The short duration of 1/60th of a second generally makes the discontinuity unnoticeable to the eye of a viewer. Also, the particular application of the camera may allow the blanked portion to be removed from the segment of video to be ultimately used. For example, the camera system's uncomplicated design makes it particularly suitable for electronic journalism where relatively short video segments are recorded for later broadcast.

The effect of the earth's magnetic field on the scanning beam can have the effect of causing a "centering" shift after the index has been stored. This type of shift will result in a uniform phase shift between the instantaneous color signal (70A) and the indexing signal and can be handled by an operator-adjustable phase shifter. Alternatively, indexing stripes can be provided at the sides of the camera tube and an automatic centering circuit implemented in known fashion.

Figure 3:
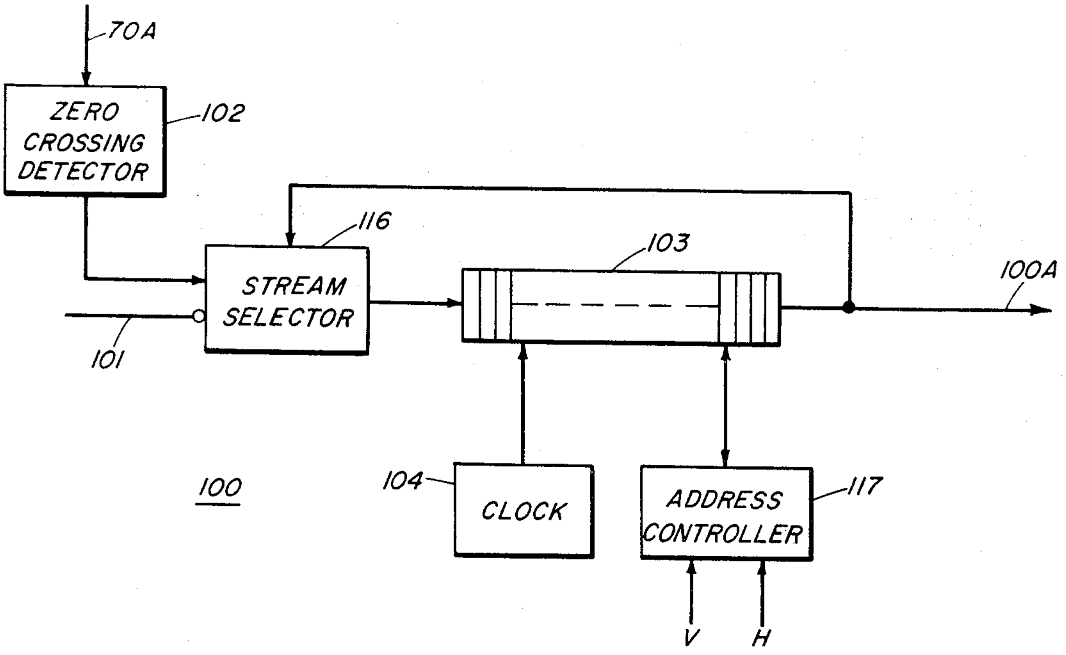
FIG. 3 is a block diagram that is helpful in illustrating the concept of digital storage utilized in the present invention; nd

A simplified version of the storage means 100, intended to illustrate the concept of a digital storage, is shown in FIG. 3 and is seen to include a zero-crossing detector 102 which receives the signal 70A. The detector 102 acts to digitize the signal 70A by generating a short pulse each time this signal crosses a zero reference axis in a positive-going manner. This means one crossing per cycle at an average frequency of 0.5 MHz., or a pulse rate of 0.5 MHz. The pulses are clocked into a shift register 103 by a clock 104 which produces clock pulses at a rate of 120 times the pulse rate, or 60 MHz. This clock rate is selected to yield a phase accuracy of about 3° (since 3°/360° = 1/120) that is adequate to meet conventional color standards. When the zero crossing detector output is clocked into register 104, each short pulse is stored as a logical 1 and the absence of a pulse is stored as a logical 0. Thus, on average, there will be about 120 0's interspersed between consecutive 1's. The actual number of 0's will, of course, vary, and it is this actual number that connotes the phase of the indexing signal.

A stream selector 105, enabled by a signal on line 101, allows new loading of the shift register 103 only during the selected fields when the solenoid 16 is activated. Otherwise, the stream selector 105 causes recirculation of the bits read out of register 103. The number of bits required per horizontal scanline is about 3000 ($60 \times 10^6 \times 50 \times 10^{-6}$), and there are about 240 active horizontal scanlines per television field. Therefore, about 720,000 bits are required for this scheme. The contents of the shift register completely recirculate in the 1/60 second television field time. An address controller 106 receives the vertical and horizontal sync signals from the sync generator 30 and coordinates the recirculation of register 103. The controller 106 keeps track of the present status of register 103 and insures line and field synchronism during recirculation.

Figure 4:
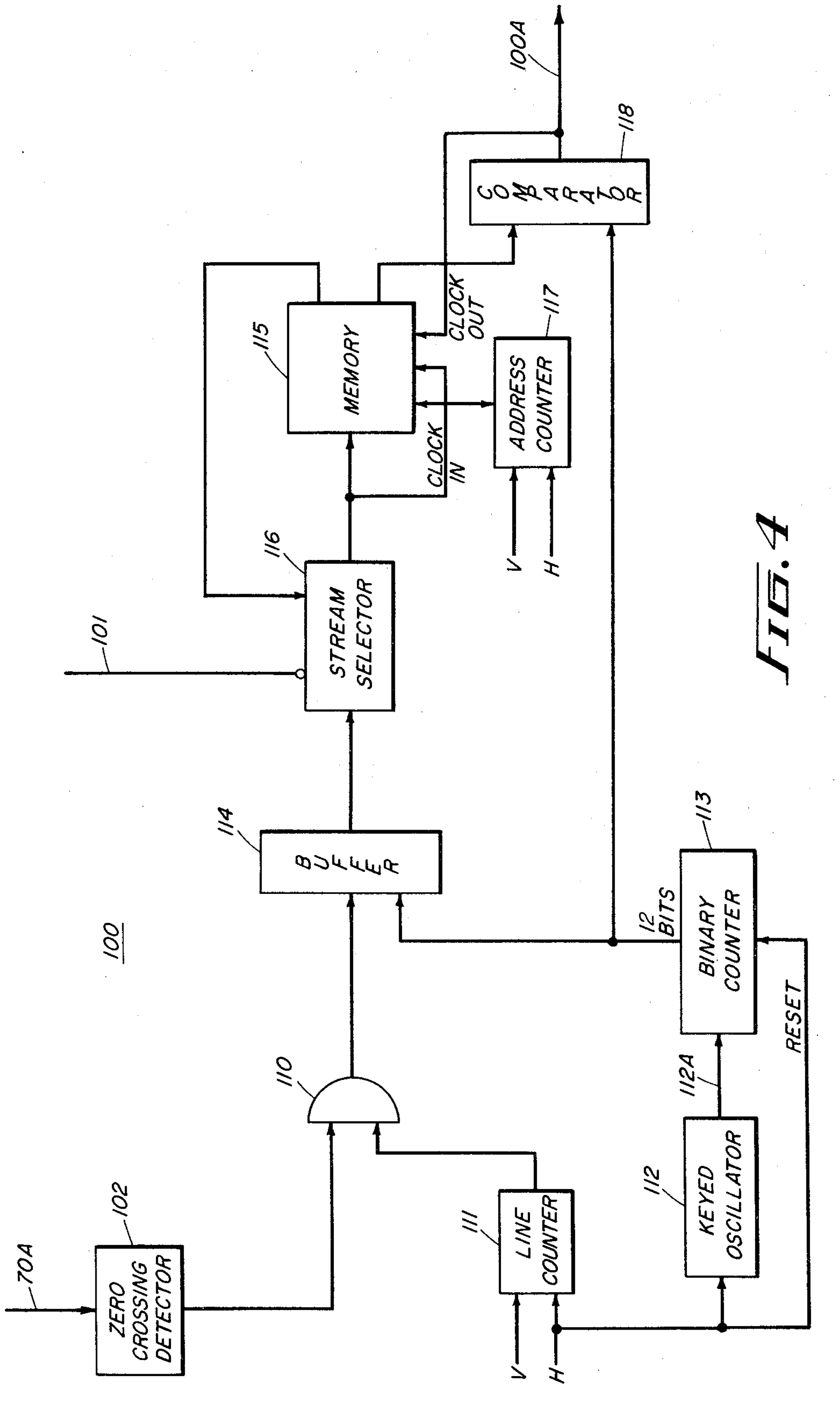
FIG. 4 is a block diagram of a digital storage means utilized in the present invention.

FIG. 4 shows a block diagram of a more practical implementation of the storage means 100, the diagram of FIG. 3 having been presented to illustrate the concept and storage objectives. In FIG. 4, the output of zero-crossing detector 102 is coupled to an AND gate 110. The other input to AND gate 110 is the output of a line counter 111 which receives the horizontal and vertical sync signals and generates an output only during every fourth scanline of the active portion of each field scan. The object is to reduce required memory by using the same line of indexing information for four consecutive scanlines. This can be done since the scanning beam behavior should not change appreciably over a short number of scanlines.

A 60 MHz keyed oscillator 112, keyed by the horizontal sync signal, functions to produce clock pulses 112A. A twelve bit binary counter 113 receives the clock pulses 112A and keeps a running count of the number of clock pulses that have occurred during the current scanline. The counter is capable of counting up to $2^{12}$, or 4,096, which is more than sufficient to handle the approximately 3000 clock pulses per active scanline. The twelve bit count is continuously made available at a twelve bit buffer 114 which, upon receiving the output of AND gate 110, enters the current count into a memory 115 via a stream selector 116. As in FIG. 3, the stream selector is enabled by a signal on line 101 to allow the loading of a new field into memory only during the selected fields when the solenoid 16 is activated.

The memory 115 can be thought of as having sixty small individual sub-memories, each of which stores the input counts for one horizontal scanline. (Recall that indexing signals for only one fourth of the 240 active scanlines are stored.) During non-selected field scans the sub-memories are sequentially activated and each one reads out and recirculates its stored counts four times. An address counter 117, synchronized by the horizontal and vertical sync signals, coordinates the recirculation of memory 115.

The output of memory 115 is made available at a twelve bit comparator which also receives the current count from counter 113. When the current count corresponds with memory output count, comparator 118 generates an output 100A that comprises the desired output of storage means 100 (see FIG. 1). Thus, during non-selected fields, the comparator 118 is utilized to reconstruct the timing associated with the counts stored in memory 115. The output 100A is also utilized to clock-out the memory 115; i.e., to read the next waiting count into the final stage of memory where it is available to comparator 118.

The storage means of FIG. 4 eliminates the unnecessary storage of large numbers of zeros which is characteristic of the system of FIG. 3. The approximate memory requirement is about 1500 twelve bit words. This reflects about sixty lines of information at about 25 words per line (i.e., 0.5 MHz. times 50 microseconds).

From the above, it will be appreciated that the frequency translation down to 0.5 MHz. eases the requirements on the storage means 100 from what they would be if it was necessary to work with the original 4.5 MHz. color signal. Also, the frequency translation facilitates the ultimate obtaining of a chrominance signal at the desired carrier frequency of 3.58 MHz. The particular geometry and frequency relationships disclosed are NTSC compatible, but it is intended that other choices for these factors be available within the spirit of the invention. Other modifications within the spirit of the invention are possible. For example, various other suitable digital storage schemes will occur to those skilled in the art as will other techniques for projecting the uniformly colored field during selected field scans. The translation of the color frequency down to a lower frequency could be achieved in other ways such as by a digital sampling technique. Also, it will be appreciated that the raw camera signal could be stored on video tape for later processing by the technique of the invention.

I claim:

1. A color television camera system for producing coherent chroma video signals representative of the color content of a scene, comprising:

a. a filter disposed in the optical path of the scene, said filter having an array of colored areas thereon;

b. means for electronically scanning the image projected through said filter and for generating color signals representative of the filtered image;

c. means for translating said color signals to a lower frequency;

d. means for projecting, during selected field scans, a uniformly colored field on said filter;

e. means for storing the translated color signals generated during said selected field scans; nd f. means for modifying translated color signals generated during non-selected field scans in accordance with the stored signals to produce coherent chroma signals.

2. A system in accordance with claim 1 further comprising means for digitizing the translated color signals generated during said selected field scans before the storage thereof.

3. A system in accordance with claim 2 further comprising means for mixing the stored signals with a color carrier signal before said stored signals are utilized to modify translated color signals generated during non-selected field scans.

4. A system in accordance with claim 3 wherein the lower sideband output of said mixing means is utilized to modify translated color signals generated during non-selected field scans.

5. A system in accordance with claim 3 wherein said color carrier signal has a frequency of about 3.58 MHz.

6. A system in accordance with claim 1 further comprising means for filtering the color signals from said scanning means to produce luminance signals.

7. A system in accordance with claim 6 further comprising means for encoding said luminance signals and said coherent chroma signals to produce composite color television signals.

8. A system in accordance with claim 1 wherein said filter array comprises triplets of colored stripes disposed in a direction perpendicular to the scanning direction.

9. A system in accordance with claim 8 wherein said stripes have widths that cause the electronic scanning means to generate color signals at about 4.5 MHz.

10. A system in accordance with claim 9 wherein said means for translating said color signals to a lower frequency comprises an oscillator having a characteristic frequency of about 4 MHz. and a mixer for mixing the oscillator signal with the color signals generated by said electronic scanning means.

11. A system in accordance with claim 8 wherein said filter stripe triplets consist of red, green and blue stripes having a spatial relationship such that the phase of a color signal generated by the scanning thereof is in accordance with the standard NTSC chrominance phase.

12. A system in accordance with claim 1 wherein said lower frequency is about .5 MHz.

13. A system in accordance with claim 1 further comprising means for mixing the stored signals with a color carrier signal before said stored signals are utilized to modify translated color signals generated during non-selected field scans.

14. A system in accordance with claim 13 wherein the lower sideband output of said mixing means is utilized to modify translated color signals generated during non-selected field scans.

15. A method of producing coherent chroma video signals representative of the color content of a scene, comprising the steps of:

a. disposing a filter in the optical path of the scene, the filter having an array of colored areas thereon;

b. electronically scanning the image projected through said filter and generating color signals representative of the filtered image;

c. translating said color signals to a lower frequency;

d. projecting, during selected field scans, a uniformly colored field on said filter;

e. storing the translated color signals generated during said selected field scans; and f. modifying the translated color signals generated during non-selected field scans in accordance with the stored signals to produce coherent chroma signals.

16. A method in accordance with claim 15 comprising the additional step of digitizing the translated color signals generated during said selected field scans before the storage thereof.

17. A method in accordance with claim 16 further comprising the step of mixing the stored signals with the color carrier signal before said stored signals are utilized to modify translated color signals generated during non-selected field scans.

18. A method in accordance with claim 17 wherein the lower sideband output of the mixing step is utilized to modify translated color signals generated during non-selected field scans.

19. A method in accordance with claim 15 comprising the additional step of filtering the color signals from said scanning means to produce luminance signals.

20. A method in accordance with claim 19 comprising the additional step of encoding the luminance signals and the coherent chroma signals to produce composite color television signals.

* * * * *